(12) United States Patent
Li et al.

(10) Patent No.: US 11,138,967 B2
(45) Date of Patent: Oct. 5, 2021

(54) VOICE RECOGNITION PROCESSING METHOD, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Xiangang Li, Beijing (CN); Bing Jiang, Beijing (CN)

(73) Assignee: BAIDU ONLINE NETWORK TECHNOLOGY (BEIJING) CO., Ltd., Beijing (CN)

(*) Notice: Subject to any disclaimer, the term of this patent is extended or adjusted under 35 U.S.C. 154(b) by 290 days.

(21) Appl. No.: 16/318,809

(22) PCT Filed: Nov. 8, 2016

(86) PCT No.: PCT/CN2016/105080
§ 371 (c)(1),
(2) Date: Jan. 18, 2019

(87) PCT Pub. No.: WO2018/014469
PCT Pub. Date: Jan. 25, 2018

(65) Prior Publication Data
US 2019/0189112 A1 Jun. 20, 2019

(30) Foreign Application Priority Data
Jul. 22, 2016 (CN) .......................... 201610585160.6

(51) Int. Cl.
*G10L 15/06* (2013.01)
*G10L 15/16* (2006.01)
(Continued)

(52) U.S. Cl.
CPC .......... *G10L 15/063* (2013.01); *G10L 15/065* (2013.01); *G10L 15/07* (2013.01);
(Continued)

(58) Field of Classification Search
CPC ......... G10L 15/22; G10L 15/26; G10L 15/30; G10L 15/063; G10L 2015/223;
(Continued)

(56) References Cited

U.S. PATENT DOCUMENTS 8,583,432 B1* 11/2013 Biadsy .................... G10L 15/18
704/235
9,153,231 B1* 10/2015 Salvador ............... G10L 15/065
(Continued)

FOREIGN PATENT DOCUMENTS

CN 103310788 A 9/2013
CN 104036774 A 9/2014
(Continued)

OTHER PUBLICATIONS

Graves, Alex, et al. "Connectionist temporal classification: labelling unsegmented sequence data with recurrent neural networks." Proceedings of the 23rd international conference on Machine learning. 2006.*
(Continued)

*Primary Examiner* — Matthew H Baker
(74) *Attorney, Agent, or Firm* — Lathrop GPM LLP

(57) ABSTRACT

A speech recognition and processing method, a device and a non-volatile computer storage medium are provided. The method comprises: performing training on a pre-set processing model according to speech sample data from all areas of a country to generate a general acoustic model for common speech (S110); and performing self-adaptive training on the general acoustic model according to speech sample data of respective province to generate an acoustic model for common speech with dialectal accent corresponding to the respective province (S120).

15 Claims, 3 Drawing Sheets

(51) Int. Cl.
  *G10L 15/065* (2013.01)
  *G10L 15/07* (2013.01)
  *G10L 15/01* (2013.01)

(52) U.S. Cl.
  CPC .............. *G10L 15/16* (2013.01); *G10L 15/01* (2013.01); *G10L 2015/0631* (2013.01)

(58) Field of Classification Search
  CPC ......... G10L 13/00; G10L 15/02; G10L 15/16; G10L 2015/088; G10L 15/187; G10L 13/08; G10L 15/07; G10L 15/18; G10L 15/183; G10L 15/197; G10L 15/1815; G10L 2015/0635; G10L 15/08; G10L 2015/025; G10L 25/18; G10L 25/24; G10L 15/1822; G10L 17/00; G10L 17/04; G10L 17/22; G10L 2015/081; G10L 2015/225; G10L 2015/228; G10L 15/065; G10L 15/28; G10L 15/32; G10L 17/06; G10L 2015/0631; G10L 2015/0636; G10L 25/48; G10L 25/78; G10L 13/02; G10L 13/047; G10L 13/06; G10L 13/086; G10L 13/10; G10L 15/06; G10L 17/02; G10L 17/18; G10L 17/24; G10L 2015/227; G10L 13/027; G10L 13/033; G10L 13/04; G10L 15/00; G10L 15/005; G10L 15/01; G10L 15/04; G10L 15/075; G10L 15/10; G10L 15/142; G10L 15/1807; G10L 15/19; G10L 15/20; G10L 15/222; G10L 15/24; G10L 17/14; G10L 2013/083; G10L 2013/105; G10L 2021/02166; G10L 2025/783; G10L 21/003; G10L 21/0208; G10L 21/0272; G10L 21/0364; G10L 21/06; G10L 25/51; G10L 25/60; G10L 25/63; G10L 25/87
  See application file for complete search history.

(56) References Cited

U.S. PATENT DOCUMENTS

| | | | | |
|---|---|---|---|---|
| 10,229,672 | B1* | 3/2019 | Rao | G10L 15/187 |
| 10,388,272 | B1* | 8/2019 | Thomson | G10L 15/063 |
| 10,403,291 | B2* | 9/2019 | Moreno | G10L 17/18 |
| 10,629,192 | B1* | 4/2020 | Streat | A63F 13/215 |
| 10,839,788 | B2* | 11/2020 | Feinauer | G10L 17/02 |
| 2008/0147404 | A1* | 6/2008 | Liu | G10L 17/26 704/256.2 |
| 2011/0295590 | A1* | 12/2011 | Lloyd | G10L 15/30 704/8 |
| 2015/0073793 | A1 | 3/2015 | Bocchieri et al. | |
| 2017/0148433 | A1* | 5/2017 | Catanzaro | G10L 25/18 |
| 2018/0053500 | A1* | 2/2018 | Sak | G10L 15/02 |
| 2020/0175961 | A1* | 6/2020 | Thomson | G10L 15/063 |

FOREIGN PATENT DOCUMENTS

| | | |
|---|---|---|
| JP | H06266384 A | 9/1994 |
| JP | 2015102806 A | 3/2015 |
| JP | 2016520879 A | 7/2016 |

OTHER PUBLICATIONS

Yi, Jiangyan, et al. "CTC Regularized Model Adaptation for Improving LSTM RNN Based Multi-Accent Mandarin Speech Recognition." Journal of Signal Processing Systems 90.7 (2018): 985-997.*

Chen, Mingming, et al. "Improving deep neural networks based multi-accent mandarin speech recognition using i-vectors and accent-specific top layer." Sixteenth Annual Conference of the International Speech Communication Association. 2015.*

Japanese Patent Application No. JP2019-502659 Office Action dated Mar. 31, 2020; 8 pages.

Japanese Patent Application No. JP2019-502659 English translation of Office Action dated Mar. 31, 2020; 7 pages.

Amazon Development Center Germany GmbH "Speech Recognition with Deep Neural Net: After Its First Introduction", Journal of the Japanese Society for Artificial Intelligence, Mar. 2016, pp. 180-188.

"Public talk" URL:https://web.archive.org/web/20160103064221/ https://ja.wikipedia.org/wiki/Public talk; 2016; 4 pages.

PCT/CN2016/105080 English translation of International Search Report and Written Opinion dated Mar. 1, 2017, 7 pages.

* cited by examiner

VOICE RECOGNITION PROCESSING METHOD, DEVICE AND COMPUTER STORAGE MEDIUM

CROSS-REFERENCE TO RELATED APPLICATIONS

This application is a US national phase of International Application No. PCT/CN2016/105080, filed on Nov. 8, 2016, which is based on and claims priority of Chinese Patent Application No. 201610585160.6, filed on Jul. 22, 2016 by BAIDU ONLINE NETWORK TECHNOLOGY (BEIJING) CO., LTD., entitled "voice recognition processing method and apparatus", the entire contents of which are incorporated herein by reference.

FIELD

The present disclosure relates to a field of speech recognition technologies, and more particularly to a speech recognition and processing method, a device and a computer storage medium.

BACKGROUND

A performance of speech recognition is one of the key factors influencing practical application of a speech recognition product. As a main part of the speech recognition, an acoustic model plays a key role in performance of the speech recognition. In training of the acoustic model, how to comprehensively use various information to improve a performance and promotion ability of the acoustic model has an important theoretical research and practical application value for a speech recognition industry.

In general, pronunciation of common speech of a user may have minor dialectal accent, for example, in pronunciation of the common speech of a user with Hunan accent, a situation that pronunciations of "h" and "f" cannot be distinguished usually appears. An acoustic model for the common speech in the speech recognition product for common speech is designed for national users, without taking into account accent differences in the common speech of users.

SUMMARY

The present disclosure aims to solve one of the foregoing technical problems to at least some extent.

Therefore, the first objective of the present disclosure is to provide a speech recognition and processing method.

The second objective of the present disclosure is to provide a speech recognition and processing apparatus.

The third objective of the present disclosure is to provide a device.

The fourth objective of the present disclosure is to provide a non-volatile computer storage medium.

To achieve above objectives, a first aspect of embodiments of the present disclosure provides a speech recognition and processing method, including:

performing training on a pre-set processing model according to speech sample data from all areas of a country, to generate a general acoustic model for common speech; and performing self-adaptive training on the general acoustic model according to speech sample data of respective province, to generate an acoustic model for common speech with dialectal accent corresponding to respective province.

To achieve the above objectives, a second aspect of embodiments of the present disclosure provides a speech recognition and processing apparatus, including a first generation module and a second generation module. The first generation module is configured to perform training on a pre-set processing model according to speech sample data from all areas of a country to generate a general acoustic model for common speech.

The second generation module is configured to perform self-adaptive training on the general acoustic model according to speech sample data of respective province to generate an acoustic model for common speech with dialectal accent corresponding to the respective province.

To achieve the above objectives, a third aspect of embodiments of the present disclosure provides a device, including: one or more processors, a memory and one or more programs. The one or more programs are stored in the memory. When executed by the one or more processors, the one or more programs are configured to perform following steps: performing training on a pre-set processing model according to speech sample data of all areas of a country, to generate a general mandarin acoustic model for common speech; and performing self-adaptive training on the general acoustic model according to speech sample data of respective province to generate an acoustic model for common speech with dialectal accent corresponding to the respective province.

To achieve the above objectives, a fourth aspect of embodiments of the present disclosure provides a non-volatile computer storage medium. The non-volatile computer storage medium stores one or more programs thereon. When executed by a device, the device is caused to perform following steps: performing training on a pre-set processing model according to speech sample data from all areas of a country to generate a general acoustic model for common speech; and performing self-adaptive training on the general acoustic model according to speech sample data of respective province to generate an acoustic model for common speech with dialectal accent corresponding to the respective province.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Description will be made in detail below to embodiments of the present disclosure. Examples of embodiments are illustrated in the accompanying drawings, in which, the same or similar numbers represent the same or similar elements or elements with the same or similar functions. Embodiments described below with reference to the accompanying drawings are exemplary, which are intended to explain the present disclosure and do not be understood a limitation of the present disclosure.

A speech recognition and processing method and a speech recognition and processing apparatus of embodiments of the present disclosure will be described below with reference to accompanying drawings.

Figure 1:
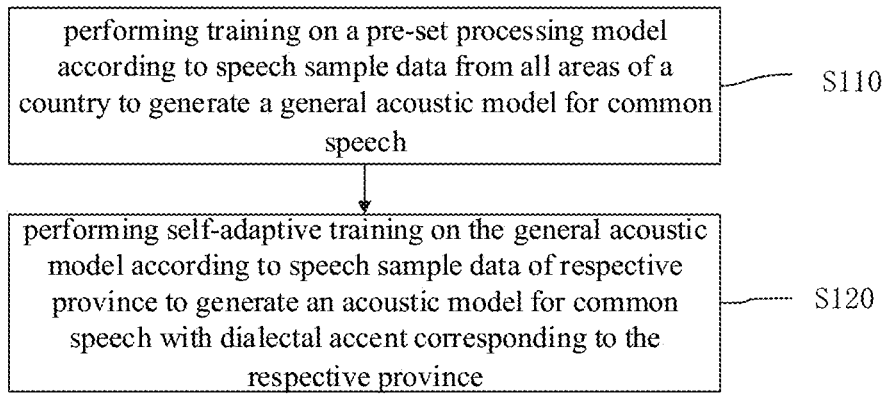
FIG. 1 is a flow chart illustrating a speech recognition and processing method according to an embodiment of the present disclosure.

FIG. 1 is a flow chart illustrating a speech recognition and processing method according to an embodiment of the present disclosure. As illustrated in FIG. 1, the method further includes the following.

In block S110, training is performed on a pre-set processing model according to speech sample data from all areas of a country, to generate a general acoustic model for common speech.

In detail, a processing model which is trained to generate an acoustic model for common speech is preset, for example, a depth neural network model is preset, and the speech sample data from all areas of the country is collected, and further the speech sample data is input into the pre-set processing model.

Furthermore, the processing model extracts a speech feature in the speech sample data, and maps the speech feature to a basic language unit, to generate the general acoustic model for common speech. The speech recognition of all users of the country can be implemented based on the general acoustic model for common speech.

In block S120, self-adaptive training is performed on the general acoustic model according to speech sample data of respective province, to generate an acoustic model for common speech with dialectal accent corresponding to the respective province.

It should be understood that, in actual application, pronunciation of common speech of a user may have minor dialectal accent, for example, in pronunciation of the common speech with Sichuan accent, pronunciations of "c" and "ch" are the same, but in the acoustic model for common speech, the pronunciations of "c" and "ch" have an obvious difference, resulting in that recognition may not be performed on speech data of the user accurately.

To solve the foregoing problems, with the speech recognition and processing method of embodiments of the present disclosure, training is performed on the basis of an original general acoustic model for common speech. Based on pronunciation features of dialectal accent of different provinces, the general acoustic model for common speech is optimized. An acoustic model for common speech with dialectal accent is established for each dialectal accent, such that the recognition can be accurately performed on speech data input by the user with the acoustic models for common speech with different dialectal accents.

In detail, in actual application, the speech sample data from respective province of the country is collected as self-adaptive data, in which, an amount of the speech sample data collected from each province may be relatively small, for example, having an order of magnitudes of hundreds of hours, such that the self-adaptive training is performed on the general acoustic model based on the speech sample data collected from respective province, to perform the self-adaptive training on respective province to obtain a corresponding acoustic model for common speech.

The foregoing self-adaptive training refers to: during a process of performing processing and analysis on the speech sample data collected from respective province of the country, a processing parameter, a boundary condition, a constraint and the like of the acoustic model for common speech may be adjusted automatically according to data characteristics of the speech sample data, such that the general acoustic model is optimized to obtain the acoustic model for common speech adaptive to statistical distribution characteristics and structural characteristics of the speech sample data from respective province.

Figure 2:
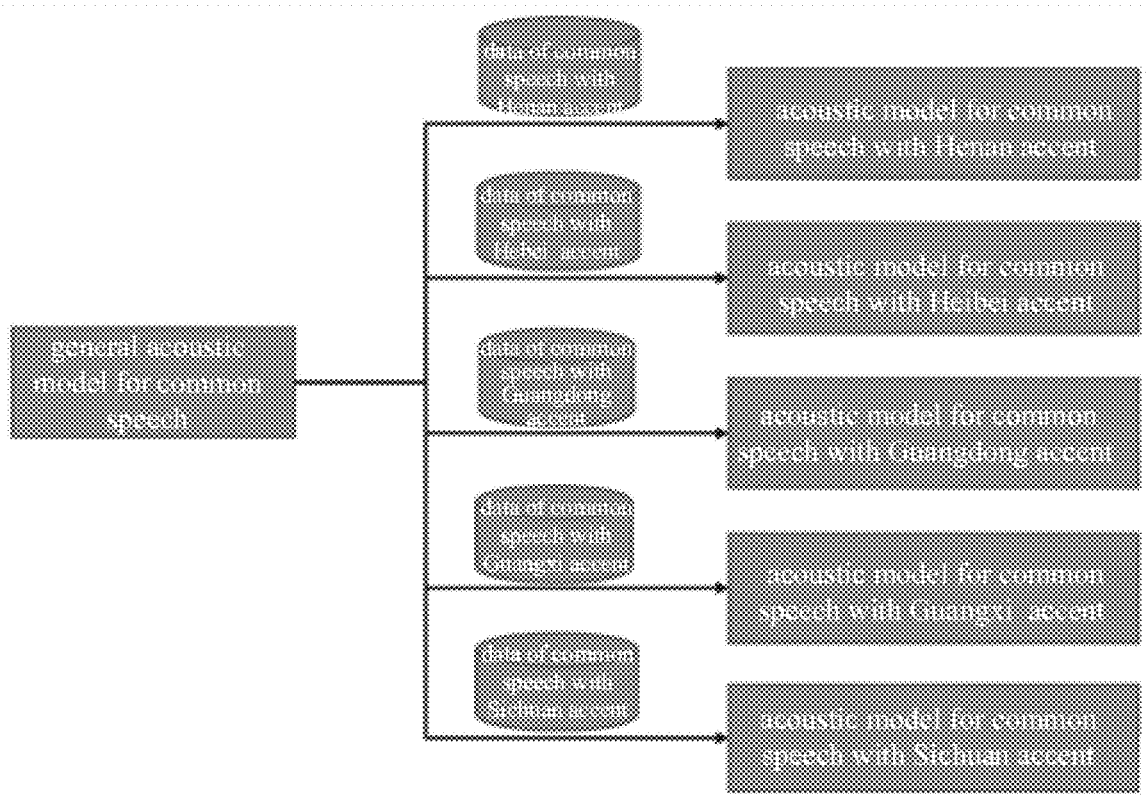
FIG. 2 is a flow chart illustrating generating an acoustic model for common speech with accent according to an embodiment of the present disclosure.

For example, as illustrated in FIG. 2, when acoustic models for common speech with accents in five provinces Guangdong, Hebei, Henan, Guangxi and Sichuan, the collected speech sample data of the foregoing five provinces is respectively input to the general acoustic model, such that the self-adaptive training is performed on the general acoustic model according to the speech sample data of respective province, to generate an acoustic model for common speech with Henan accent, an acoustic model for common speech with Hebei accent and the like corresponding respectively to the foregoing five provinces.

In conclusion, with the speech recognition and processing method of embodiments of the present disclosure, the training is performed on the pre-set processing model according to the speech sample data from all areas of the country to generate the general acoustic model for common speech, and the self-adaptive training is performed on the general acoustic model according to the speech sample data of respective province to generate the acoustic model for common speech with dialectal accent corresponding to the respective province. In this way, the acoustic model for common speech with dialectal accent is established based on accent differences of users from different areas, thereby improving a performance of speech recognition.

Based on the foregoing embodiments, to further ensure practicability of the speech recognition and processing method, after generating the acoustic model for common speech with dialectal accent corresponding to respective province, a performance of the generated acoustic models for common speech with dialectal accents may further be verified, such that only the acoustic model for common speech with dialect accent that has improved performance with respect to the general acoustic model is deployed online.

Figure 3:
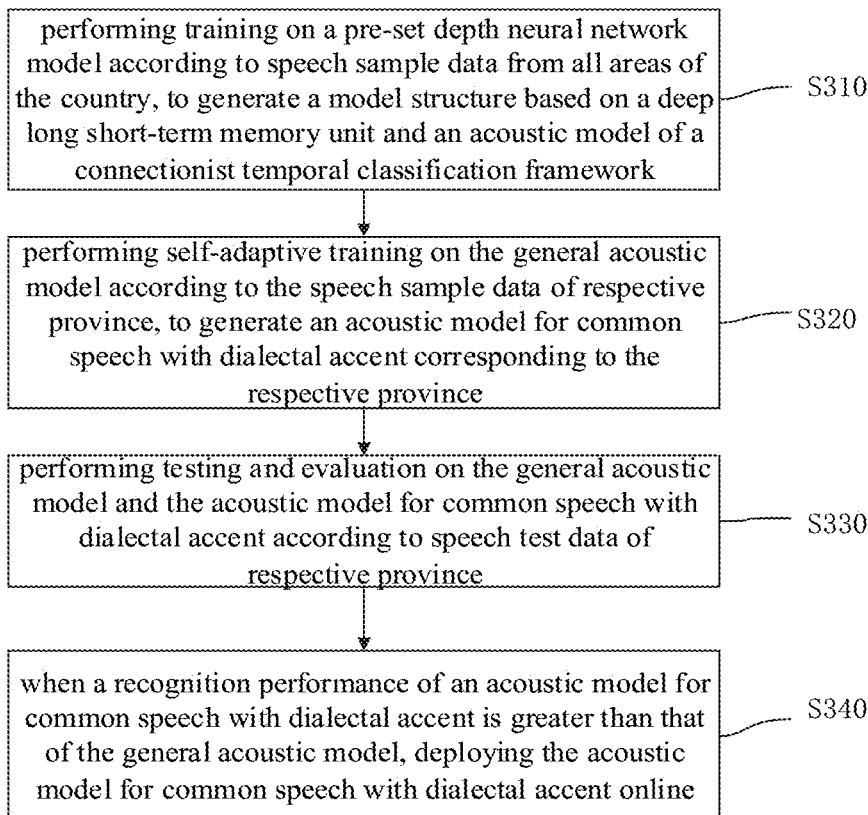
FIG. 3 is a flow chart illustrating a speech recognition and processing method according to another embodiment of the present disclosure.

FIG. 3 is a flow chart illustrating a speech recognition and processing method according to another embodiment of the present disclosure. As illustrated in FIG. 3, the method includes the following.

In block S310, training is performed on a pre-set depth neural network model according to speech sample data from all areas of a country, to generate a connectionist temporal classification framework including a model structure based on a deep long short-term memory unit.

In an embodiment of the present disclosure, the depth neural network model may be preset. An input of the depth neural network may be a speech acoustic feature spliced from one or more frames, and an output is an initial-final unit related to the context, that is, the initial-final unit related to the context is classified based on an input acoustic feature, to generate a related acoustic model.

In detail, the speech sample data from all areas of the country is input into the depth neural network model to perform training. A training processing is performed on the classification of the initial-final unit related to the context based on the acoustic feature of the input speech sample data, to generate a model structure based on the deep long short-term memory unit and the acoustic model of the connectionist temporal classification framework.

In block S320, self-adaptive training is performed on the general acoustic model according to speech sample data of respective province, to generate an acoustic model for common speech with dialectal accent corresponding to the respective province.

It should be noted that, the self-adaptive training may be performed on the general acoustic model by employing various self-adaptive training methods based on different application scenarios.

In a first example, the self-adaptive training may be performed on the general acoustic model by employing a self-adaptive training method for tuning a basic model with a small learning rate.

In the example, by using the speech sample data for accent, fine adjustment is performed on the general acoustic model with a lower learning rate when the general acoustic model is optimized.

Since the existing general acoustic model has too large of online model parameters, learning of small data volume is easy to cause model overfitting and poor promotion, such that when the self-adaptive training is performed, a self-adaptive updating method of L2 norm regularization and KL divergence regularization may be employed, to perform the self-adaptive training.

Both of the foregoing two self-adaptive updating methods may realize updating by employing a standard cross entropy criterion and error back propagation method. A target function of the norm regularization may be represented as:

$$\tilde{E}(w) = E(w) + \frac{\lambda}{2} w^T w,$$

and E(w) represents the target function, in which, w represents a model parameter and λ represents a regularization parameter. A target function of the KL divergence regularization is represented as:

$$L(w) = \frac{1}{T} \sum_t \sum_{q_t} \tilde{P}(q_t \mid o_t, W_0) \log(q_t \mid o_t, W),$$

in which $\tilde{P}(q_t|o_t,W_0)=(1-\alpha) P_{ref}(q_t|o_t)+\alpha P(q_t|o_t,W_0)$, and α represents a norm regularization coefficient. $o_t$ represents a feature of a t-th frame sample. $q_t$ represents a mark corresponding to the t-th frame sample. W represents a model parameter. $W_0$ represents a current model parameter. Under the KL divergence regularization, a target probability expression is a linear interpolation of a distribution of a model to be updated and a distribution of adaptive data under true mark.

In a second example, a self-adaptive training method for only part of model parameters is used to realize the self-adaptive training on the general acoustic model.

In the example, most of the model parameters are kept to be consistent with the original general model, and biasing of an output layer or a hidden layer is adjusted. Since the size in updated parameters is not large, it is generally not easy to overfit.

In a detailed implementation procedure, only the parameter of the output layer is updated and a method for singular value decomposition is used in a deep bottleneck layer to perform a self-adaptive updating for fewer parameters, so as to reduce model parameter quantity to be updated of the self-adaptive model.

In a third example, a self-adaptive training method introducing a new feature is used to realize the self-adaptive training on the general acoustic model.

The self-adaptive training method in the example takes particularity of the dialect accent into account, and introduces a more classic ivector and a speaker coding method in voiceprint and adaptive training. By performing extraction of a feature vector containing various types of complex information on each dialect speech and adding the feature vector to the input feature, a self-adaptive training can be performed.

The ivector extraction is performed by using a real-time ivector extraction method, and the corresponding ivector vector extracted from each packet of speech data is decoded in actual decoding. In detail, ivector may be extracted by using a formula of M=m+Tw.

M is a mean super vector of all training corpora, and m is a mean super vector of a current data packet accumulated with target speech. T is a load matrix, and w is the ivector to be obtained.

After obtaining the ivector in the current corpus data, each frame feature will be spliced onto the ivector feature to form a new feature and then retrain the acoustic model. During training, only the weights of model parameters of the ivector feature are updated, while the original model parameters are kept unchanged, to ensure that the model is not overfitting, at the same time, the updated model has less change compared to the original model, such that a promotion effect of the acoustic model for common speech with dialect accent is ensured.

In block S330, testing and evaluation is performed on the general acoustic model and the acoustic model for common speech with dialectal accent according to speech test data of respective province.

In detail, the generated acoustic model for common speech with dialectal accent corresponding to respective province is not too biased towards the general acoustic model. In actual application, it is possible that a performance of the acoustic model for common speech with dialectal accent is not greater than that of the general acoustic model.

Therefore, to ensure that a performance of the acoustic model deployed online is improved, the testing and evaluation needs to be performed on the general acoustic model and the acoustic model for common speech with dialectal accent according to the speech test data of respective province.

For example, speech test data with Henan accent is input into the general acoustic model and the acoustic model for common speech with Heinan accent, and the testing and evaluation is performed on a performance of the general acoustic model and the acoustic model for common speech with Heinan accent according to accuracies of the general acoustic model and the acoustic model for common speech with Heinan accent.

In block S340, when a recognition performance of an acoustic model for common speech with dialectal accent is greater than that of the general acoustic model, the acoustic model for common speech with dialectal accent is deployed online.

In detail, when the recognition performance of the acoustic model for common speech with dialectal accent is greater than that of the general acoustic model, it indicates that the acoustic model for common speech with dialectal accent can recognize the common speech with accent more accurately with respect to the general acoustic model. Therefore, the acoustic model for common speech with dialectal accent is deployed online.

In conclusion, with the speech recognition and processing method of embodiments of the present disclosure, the testing and evaluation is performed on the general acoustic model for common speech and the acoustic model for common speech with dialectal accent according to the speech test data of respective province. The acoustic model for common speech with dialectal accent is deployed online when the recognition performance of the acoustic model for common speech with dialectal accent is greater than that of the general acoustic model. Therefore, the acoustic model for common speech with dialectal accent that has higher recognition performance than the general acoustic model for common speech is deployed online, such that practicality of the speech recognition and processing method is guaranteed.

Based on the foregoing description, in actual application, after deploying the acoustic model for common speech with dialectal accent online, dialectal accent of the user may be determined by employing a plurality of methods. Recognition is performed on speech information input by the user according to the acoustic model for common speech with the dialectal accent.

In the first example, personal information of the user may be obtained, and the dialect accent of the user is determined according to a province to which native place information of the personal information belongs, such that the recognition is performed on the speech information input by the user according to the acoustic model for common speech with the dialectal accent.

In the second example, network address information corresponding to a speech recognition request sent by the user may be obtained, and a province to which the network address information belongs is determined, to obtain the dialectal accent of the user, such that the recognition is performed on the speech information input by the user according to the acoustic model for common speech with the dialectal accent.

Figure 4:
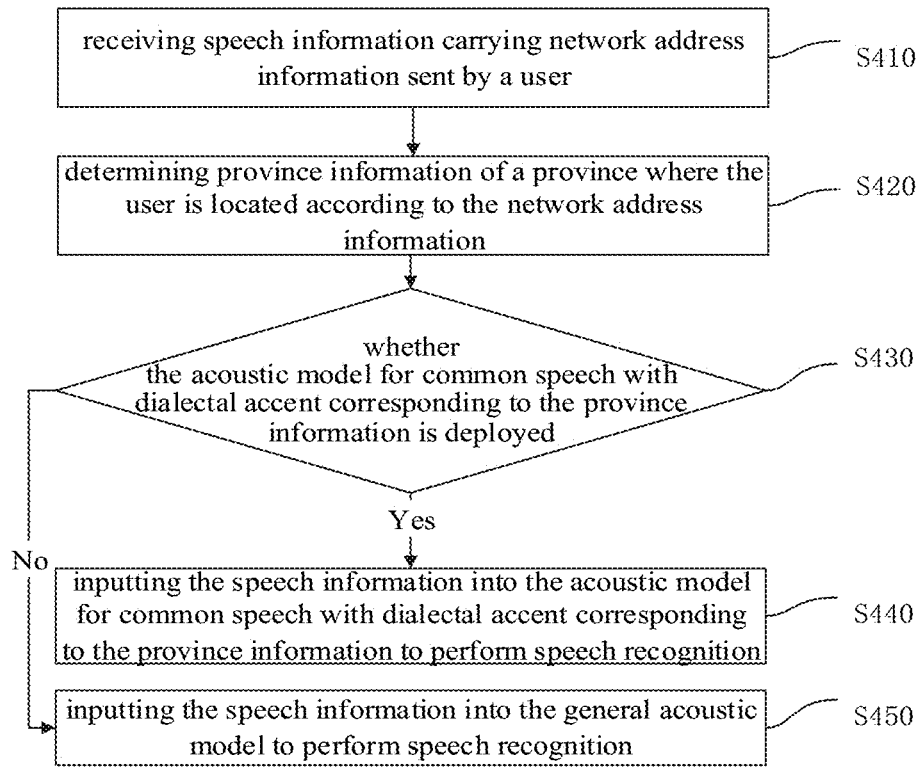
FIG. 4 is a flow chart illustrating a speech recognition and processing method according to still another embodiment of the present disclosure.

To illustrate more clearly how to determine the dialectal accent of the user and perform the recognition on the speech information input by the user according to the acoustic model for common speech with the dialectal accent, referring to FIG. 4, an example is given based on the detailed implementation procedure of the second example above.

FIG. 4 is a flow chart illustrating a speech recognition and processing method according to still another embodiment of the present disclosure. As illustrated in FIG. 4, after the act at block S340 illustrated in FIG. 3, the method including the following.

In block S410, speech information carrying network address information sent by a user is received.

In block S420, province information of a province where the user is located is determined according to the network address information;

In detail, the speech information carrying network address information sent by the user may be received, and the province where the user is located is determined according to the network address information, for example, the province information of the province where the user is located may be determined according to IP address in the network address information.

In block S430, it is judged whether the acoustic model for common speech with dialectal accent corresponding to the province information is deployed;

In block S440, the speech information is input into the acoustic model for common speech with dialectal accent corresponding to the province information to perform speech recognition when the acoustic model for common speech with dialectal accent corresponding to the province information is deployed;

In block S450, the speech information is input into the general acoustic model to perform speech recognition when the acoustic model for common speech with dialectal accent corresponding to the province information is not deployed.

In detail, after determining the province information of the province where the user is located, it is judged whether the acoustic model for common speech with dialectal accent corresponding to the province information is deployed. It indicates there is the acoustic model for common speech with dialectal accent corresponding to the province information that has the recognition performance higher the general acoustic model when the acoustic model for common speech with dialectal accent corresponding to the province information is deployed, such that the speech information is input to the acoustic model for common speech with dialectal accent corresponding to the province information to perform speech recognition.

It indicates that no acoustic model for common speech with dialectal accent corresponding to the province information has the recognition performance higher the general acoustic model when the acoustic model for common speech with dialectal accent corresponding to the province information is not deployed, such that the speech information is input to the general acoustic model to perform speech recognition.

In conclusion, with the speech recognition and processing method of embodiments of the present disclosure, the province information of the province where the user is located is determined according to the speech information carrying network address information sent by the user, and the acoustic model for common speech with dialectal accent is used to recognize the speech information of the user when the acoustic model for common speech with dialectal accent corresponding to the province information is deployed. In this way, the performance of the speech recognition is improved.

Figure 5:
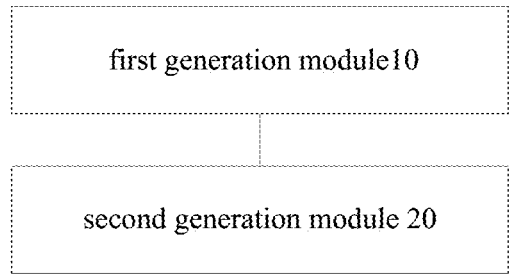
FIG. 5 is a block diagram illustrating a speech recognition and processing apparatus according to an embodiment of the present disclosure.

To achieve the foregoing embodiments, the present disclosure further provides a speech recognition and processing apparatus. FIG. 5 is a block diagram illustrating a speech recognition and processing apparatus according to an embodiment of the present disclosure. As illustrated in FIG. 5, the apparatus includes a first generation module 10 and a second generation module 20.

The first generation module 10 is configured to perform training on a pre-set processing model according to speech sample data from all areas of a country to generate a general acoustic model for common speech.

In detail, a processing model which is trained to generate the acoustic model for common speech is preset, for example, a depth neural network model is preset. Furthermore, the speech sample data from all areas of the country is collected, and the speech sample data is input to the pre-set processing model.

Furthermore, the first generation module 10 extracts a speech feature in the speech sample data with a processing model, and maps a speech feature to a basic language unit, to generate a general acoustic model for common speech, and speech recognition for all users of the country may be implemented based on the general acoustic model for common speech.

The second generation module 20 is configured to perform self-adaptive training on the general acoustic model according to speech sample data of respective province to generate an acoustic model for common speech with dialectal accent corresponding to the respective province.

In detail, in actual application, the speech sample data from respective province of the country is collected as self-adaptive data, in which, an amount of the speech sample data collected from each province may be relatively small, for example, having an order of magnitudes of hundreds of hours, such that the second generation module 20 performs the self-adaptive training on the general acoustic model based on the speech sample data of respective province, to perform the self-adaptive training on respective province to obtain a corresponding acoustic model for common speech.

It should be noted that, the foregoing illustration for the embodiments of the speech processing method is further applicable to the speech processing apparatus, and the implementation principles are similar, which will not be elaborated herein.

In conclusion, with the speech recognition and processing apparatus of embodiments of the present disclosure, the training is performed on the pre-set processing model according to the speech sample data from all areas of the country to generate the general acoustic model for common speech; and the self-adaptive training is performed on the general acoustic model according to the speech sample data of respective province to generate an acoustic model for common speech with dialectal accent corresponding to the respective province. In this way, the acoustic model for common speech with dialectal accent is established based on accent differences of users from different areas, thereby improving a performance of speech recognition.

Based on the foregoing embodiments, to further ensure practicability of the speech recognition and processing method, after generating the acoustic model for common speech with dialectal accent corresponding to respective province, a performance of the generated acoustic models for common speech with dialectal accents may further be verified, such that only the acoustic model for common speech with dialect accent that has improved performance with respect to the general acoustic model is deployed online.

Figure 6:
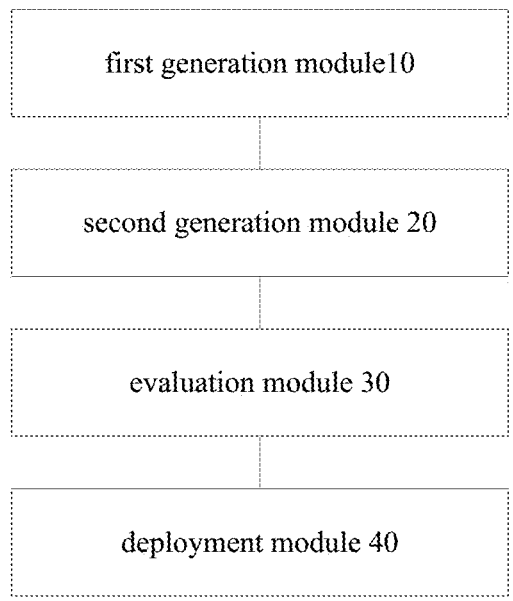
FIG. 6 is a block diagram illustrating a speech recognition and processing apparatus according to another embodiment of the present disclosure.

FIG. 6 is a block diagram illustrating a speech recognition and processing apparatus according to another embodiment of the present disclosure. As illustrated in FIG. 6, based on FIG. 5, the apparatus further includes an evaluation module 30 and a deployment module 40.

The evaluation module 30 is configured to perform testing and evaluation on the general acoustic model and the acoustic model for common speech with the dialectal accent according to speech test data of respective province.

The deployment module 40 is configured to deploy an acoustic model for common speech with dialectal accent online, when a recognition performance of the acoustic model for common speech with dialectal accent is greater than that of the general acoustic model.

In an embodiment of the present disclosure, the first generation module 10 further inputs speech sample data from all areas of a country to a depth neural network model to perform training, performs training processing on an initial-final unit related to the context based on the acoustic feature of input speech sample data to generate a model structure based on a deep long short-term memory unit and the acoustic model of a connectionist temporal classification framework.

Furthermore, the second generation module 20 may perform self-adaptive training on the general acoustic model by methods such as a self-adaptive training method for tuning a basic model with a small learning rate, a self-adaptive training method for tuning only part of model parameters and a self-adaptive training method introducing a new feature, to generate the acoustic model common speech with for dialectal accent.

To ensure that a performance of the acoustic model deployed online is improved, the evaluation module 30 needs to perform testing and evaluation on the general acoustic model and the acoustic model for common speech with the dialectal accent according to speech test data of respective province.

Further, it indicates that the acoustic model for common speech with dialectal accent can recognize the common speech with accent more accurately with respect to the general acoustic model when a recognition performance of the acoustic model for common speech with dialectal accent is greater than that of the general acoustic model. Therefore, the deployment module 40 deploys the acoustic model for common speech with dialectal accent online.

It should be noted that, the foregoing illustration for the speech processing method embodiments is further applicable to the speech processing apparatus, and the implementation principles are similar, which will not be elaborated herein.

In conclusion, with the speech recognition and processing apparatus of embodiments of the present disclosure, the testing and evaluation is performed on the general acoustic model for common speech and the acoustic model for common speech with the dialectal accent according to the speech test data of respective province. The acoustic model for common speech with dialectal accent is deployed online when the recognition performance of the acoustic model for common speech with dialectal accent is greater than that of the general acoustic model. Therefore, the acoustic model for common speech with dialectal accent that has higher recognition performance than the general acoustic model for common speech is deployed online, such that practicality of the speech recognition and processing method is guaranteed.

Based on the foregoing description, in actual application, after deploying the acoustic model for common speech with dialectal accent online, dialectal accent of the user may be determined by employing a plurality of methods. Recognition is performed on speech information input by the user according to the acoustic model for common speech with the dialectal accent.

Figure 7:
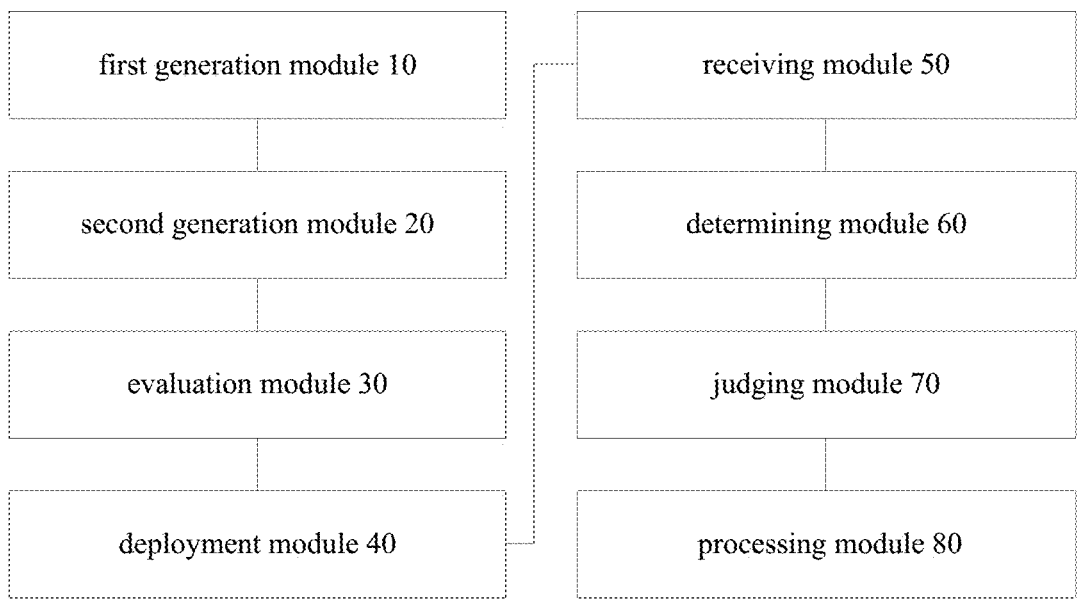
FIG. 7 is a block diagram illustrating a speech recognition and processing apparatus according to still another embodiment of the present disclosure.

FIG. 7 is a block diagram illustrating a speech recognition and processing apparatus according to still another embodiment of the present disclosure. As illustrated in FIG. 7, based on FIG. 6, the apparatus further includes: a receiving module 50, a determining module 60, a judging module 70 and a processing module 80.

The receiving module 50 is configured to receive speech information carrying network address information sent by a user.

The determining module 60 is configured to determine province information of a province where the user is located according to the network address information.

In detail, the receiving module 50 may receive the speech information carrying the network address information sent by the user, and furthermore, the determining module 60 may determine the province where the user is located according to the network address information, for example, an the province information where the user is located may be determined according to an IP address and the like in the network address information.

The judging module 70 is configured to judge whether the acoustic model for common speech with dialectal accent corresponding to the province information is deployed.

The processing module 80 is configured to input the speech information into the acoustic model for common speech with dialectal accent corresponding to the province information to perform speech recognition when the acoustic model for common speech with dialectal accent corresponding to the province information is deployed.

The processing module 80 is further configured to input the speech information into the general acoustic model to perform speech recognition when the acoustic model for common speech with dialectal accent corresponding to the province information is not deployed.

In detail, after determining the province information of the province where the user is located, the judging module 70 may judge whether the acoustic model for common speech with the dialectal accent corresponding to the province information is deployed. It indicates there is the acoustic model for common speech with dialectal accent corresponding to the province information that has the recognition performance higher the general acoustic model when the acoustic model for common speech with dialectal accent corresponding to the province information is deployed, such that the processing module 80 inputs the speech information into the acoustic model for common speech with dialectal accent corresponding to the province information to perform speech recognition.

It indicates that no acoustic model for common speech with dialectal accent corresponding to the province information has the recognition performance higher the general acoustic model when the acoustic model for common speech with dialectal accent corresponding to the province information is not deployed, such that the processing module 80 inputs the speech information into the general acoustic model corresponding to the province information to perform speech recognition.

It should be noted that, the foregoing illustration for the speech processing method embodiments is further applicable to the speech processing apparatus, and the implementation principles are similar, which will not be elaborated herein.

In conclusion, with the speech recognition and processing apparatus of embodiments of the present disclosure, the province information of the province where the user is located is determined according to the speech information carrying network address information sent by the user, and the acoustic model for common speech with dialectal accent is used to recognize the speech information of the user when the acoustic model for common speech with dialectal accent corresponding to the province information is deployed. In this way, the performance of the speech recognition is improved.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

Although embodiments of the present disclosure have been shown and described above. It should be understood that, the above embodiments are exemplary, and it would be appreciated by those skilled in the art that the above embodiments cannot be construed to limit the present disclosure, and changes, alternatives, and modifications can be made in the embodiments without departing from scope of the present disclosure.

What is claimed is:

1. A speech recognition and processing method, comprising:
    performing training on a pre-set processing model according to speech sample data from all areas of a country, to generate a general acoustic model for common speech; and
    performing self-adaptive training on the general acoustic model according to speech sample data of respective province, to generate an acoustic model for common speech with dialectal accent corresponding to the respective province;
    wherein, performing the training on the pre-set processing model according to the speech sample data from all areas of the country, to generate the general acoustic model for common speech, comprises:
    performing training on a pre-set depth neural network model according to the speech sample data from all areas of the country, to generate an acoustic model of a connectionist temporal classification framework, the acoustic model of the connectionist temporal classification framework comprising a model structure based on a deep long short-term memory unit.

2. The method according to claim 1, wherein, performing the self-adaptive training on the general acoustic model according to the speech sample data of respective province, comprises one of the following:
    performing a self-adaptive training method for tuning a basic model with a small learning rate; or
    performing a self-adaptive training method for tuning only a part of model parameters; and
    performing a self-adaptive training method introducing a new feature.

3. The method according to claim 2, wherein, the self-adaptive training method for tuning a basic model with a small learning rate comprises: a self-adaptive updating method of L2 norm regularization and a self-adaptive updating method of KL divergence regularization.

4. The method according to claim 3, wherein, each of the self-adaptive updating method of L2 norm regularization and the self-adaptive updating method of KL divergence regularization is realized by a standard cross entropy criterion and an error back propagation method.

5. The method according to claim 1, wherein, after generating the acoustic model for common speech with dialectal accent corresponding to respective province, the method further comprises:
    performing testing and evaluation on the general acoustic model and the acoustic model for common speech with dialectal accent according to speech test data of respective province; and when a recognition performance of an acoustic model for common speech with dialectal accent is greater than that of the general acoustic model, deploying the acoustic model for common speech with dialectal accent online.

6. The method according to claim 1, wherein, after deploying the acoustic model for common speech with dialectal accent online, the method further comprises:
   receiving speech information carrying network address information sent by a user;
   determining province information of a province where the user is located according to the network address information;
   judging whether the acoustic model for common speech with dialectal accent corresponding to the province information is deployed;
   inputting the speech information into the acoustic model for common speech with dialectal accent corresponding to the province information to perform speech recognition when the acoustic model for common speech with dialectal accent corresponding to the province information is deployed; and
   inputting the speech information into the general acoustic model to perform speech recognition when the acoustic model for common speech with dialectal accent corresponding to the province information is not deployed.

7. The method according to claim 1, wherein, performing self-adaptive training on the general acoustic model according to speech sample data of respective province to generate the acoustic model for common speech with dialectal accent corresponding to the respective province comprises:
   during processing and analyzing the speech sample data of respective province, automatically adjusting a processing parameter, a boundary condition, or a constraint according to data characteristics of the speech sample data, so as to optimize the general acoustic model to obtain the acoustic model for common speech with dialectal accent corresponding to the respective province.

8. A device, comprising:
   one or more processors;
   a memory;
   one or more programs, stored in the memory, when executed by the one or more processors, configured to perform following steps:
   performing training on a pre-set processing model according to speech sample data from all areas of a country to generate a general acoustic model for common speech; and
   performing self-adaptive training on the general acoustic model according to speech sample data of respective province to generate an acoustic model for common speech with dialectal accent corresponding to the respective province;
   wherein, performing the training on the pre-set processing model according to the speech sample data from all areas of the country, to generate the general acoustic model for common speech, comprises:
   performing training on a pre-set depth neural network model according to the speech sample data from all areas of the country, to generate an acoustic model of a connectionist temporal classification framework, the acoustic model of the connectionist temporal classification framework comprising a model structure based on a deep long short-term memory unit.

9. The device according to claim 8, wherein, performing the self-adaptive training on the general acoustic model according to the speech sample data of respective province, comprises one of followings:
   performing a self-adaptive training method for tuning a basic model with a small learning rate;
   performing a self-adaptive training method for tuning only a part of model parameters; and
   performing a self-adaptive training method introducing a new feature.

10. The device according to claim 9, wherein, the self-adaptive training method for tuning a basic model with a small learning rate comprises: a self-adaptive updating method of L2 norm regularization and a self-adaptive updating method of KL divergence regularization.

11. The device according to claim 10, wherein, each of the self-adaptive updating method of L2 norm regularization and the self-adaptive updating method of KL divergence regularization is realized by a standard cross entropy criterion and an error back propagation method.

12. The device according to claim 8, wherein, after generating the acoustic model for common speech with dialectal accent corresponding to respective province, the one or more programs are further configured to perform followings:
   performing testing and evaluation on the general acoustic model and the acoustic model for common speech with dialectal accent according to speech test data of respective province; and
   when a recognition performance of an acoustic model for common speech with dialectal accent is greater than that of the general acoustic model, deploying the acoustic model for common speech with dialectal accent online.

13. The device according to claim 8, wherein, after deploying the acoustic model for common speech with dialectal accent online, the one or more programs are further configured to perform followings:
   receiving speech information carrying network address information sent by a user;
   determining province information of a province where the user is located according to the network address information;
   judging whether the acoustic model for common speech with dialectal accent corresponding to the province information is deployed;
   inputting the speech information into the acoustic model for common speech with dialectal accent corresponding to the province information to perform speech recognition when the acoustic model for common speech with dialectal accent corresponding to the province information is deployed; and
   inputting the speech information into the general acoustic model to perform speech recognition when the acoustic model for common speech with dialectal accent corresponding to the province information is not deployed.

14. The device according to claim 8, wherein, performing self-adaptive training on the general acoustic model according to speech sample data of respective province to generate the acoustic model for common speech with dialectal accent corresponding to the respective province comprises:
   during processing and analyzing the speech sample data of respective province, automatically adjusting a processing parameter, a boundary condition, or a constraint according to data characteristics of the speech sample data, so as to optimize the general acoustic model to obtain the acoustic model for common speech with dialectal accent corresponding to the respective province.

15. A non-volatile computer storage medium having stored thereon one or more programs, that when executed by a device, the device is caused to perform following steps:
   performing training on a pre-set processing model according to speech sample data from all areas of a country to generate a general acoustic model for common speech; and
   performing self-adaptive training on the general acoustic model according to speech sample data of respective province to generate an acoustic model for common speech with dialectal accent corresponding to the respective province;
   wherein, performing the training on the pre-set processing model according to the speech sample data from all areas of the country, to generate the general acoustic model for common speech, comprises:
   performing training on a pre-set depth neural network model according to the speech sample data from all areas of the country, to generate an acoustic model of a connectionist temporal classification framework, the acoustic model of the connectionist temporal classification framework comprising a model structure based on a deep long short-term memory unit.

* * * * *